Jan. 18, 1955  S. J. GARTNER  2,699,831
REEL TYPE STRIP CUTTER WITH RAKE ANGLE AND CHIP DISCHARGE
Filed Nov. 22, 1949  3 Sheets-Sheet 1
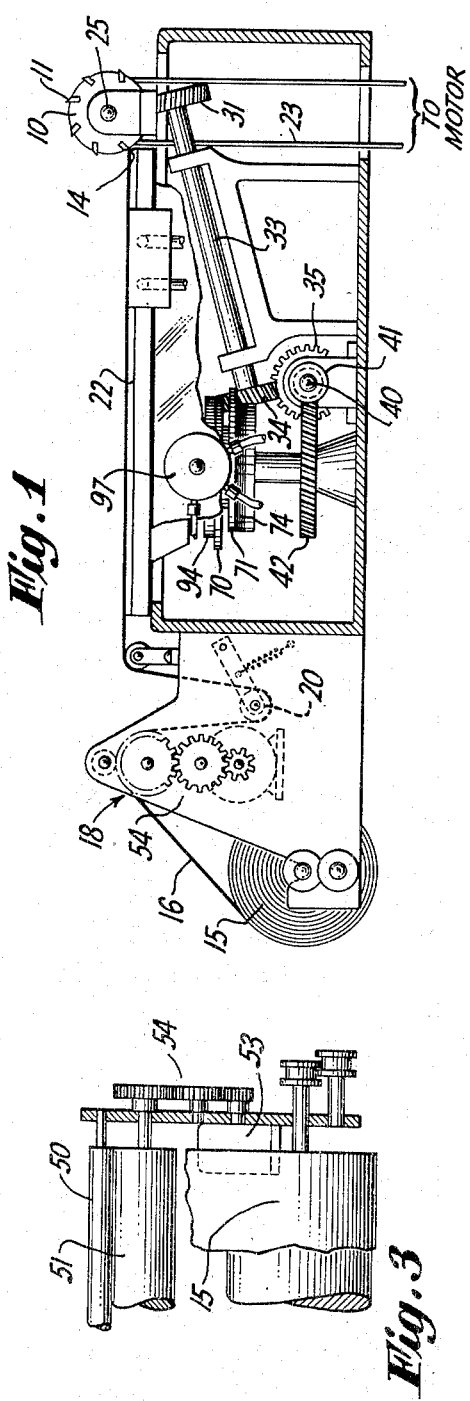
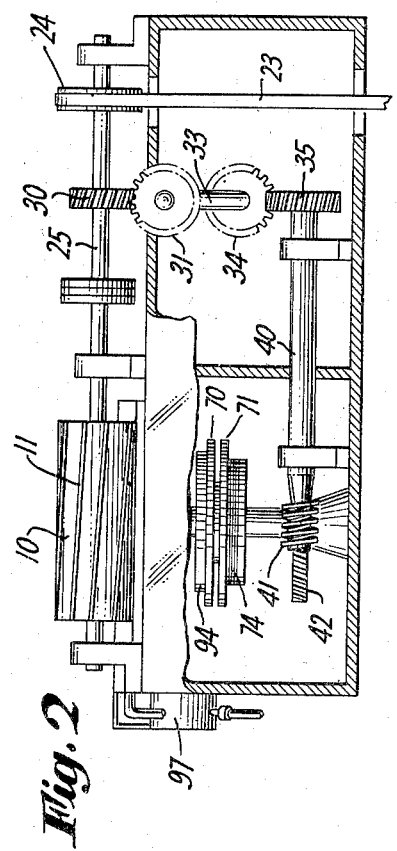
INVENTOR
STANLEY J. GARTNER
BY
ATTORNEY

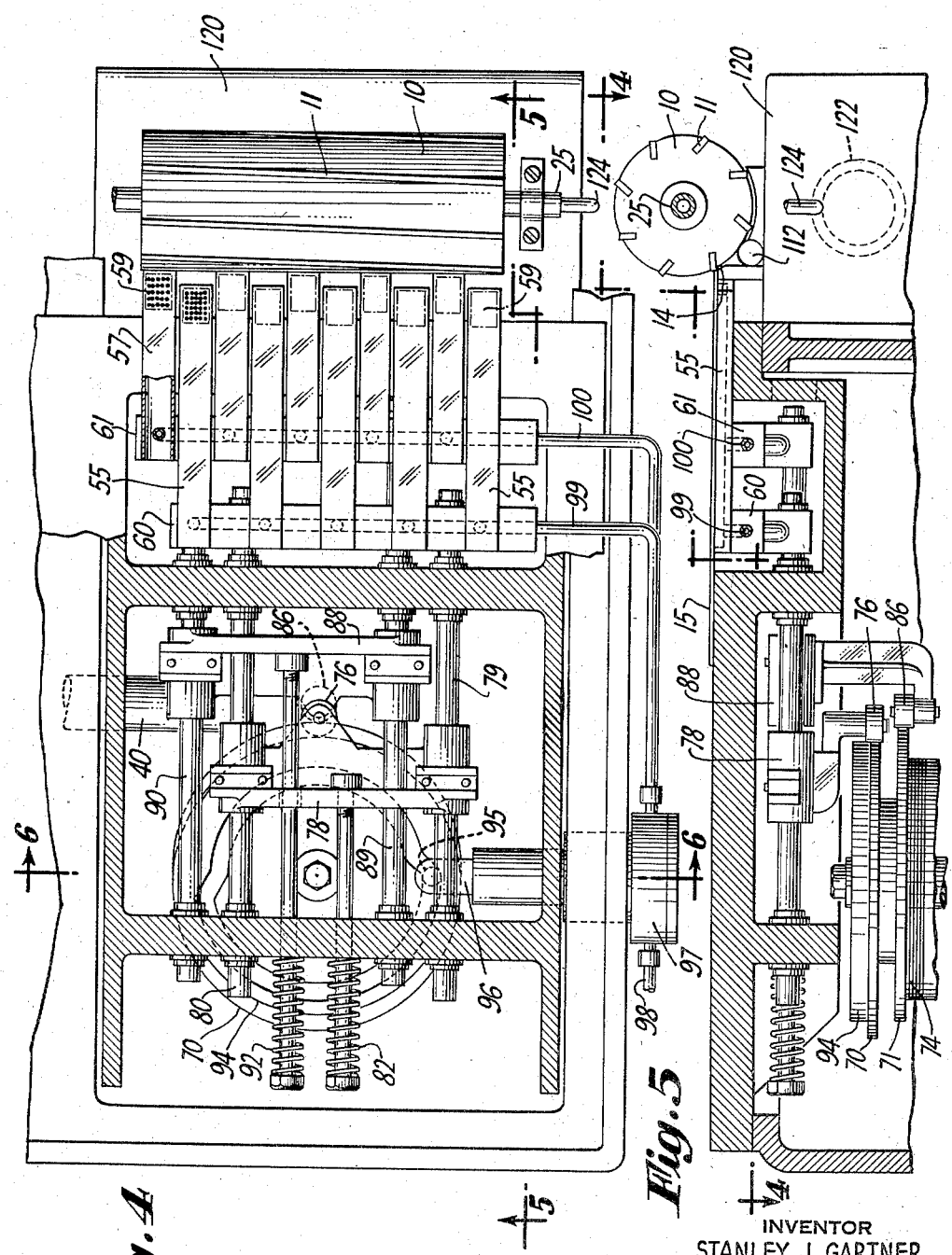

Jan. 18, 1955 S. J. GARTNER 2,699,831
REEL TYPE STRIP CUTTER WITH RAKE ANGLE AND CHIP DISCHARGE
Filed Nov. 22, 1949 3 Sheets-Sheet 3
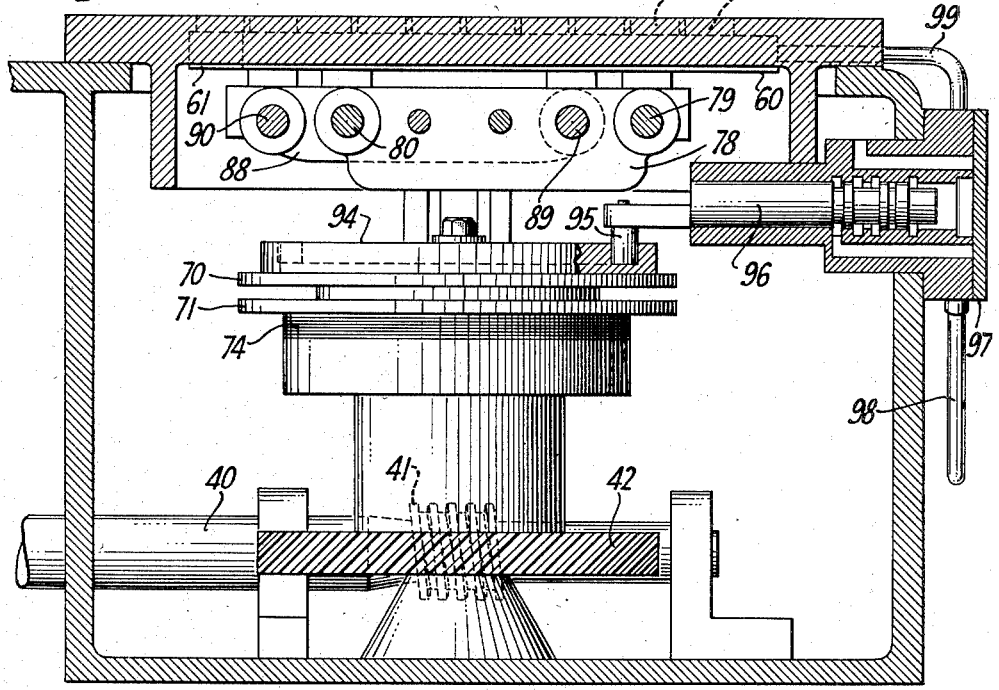
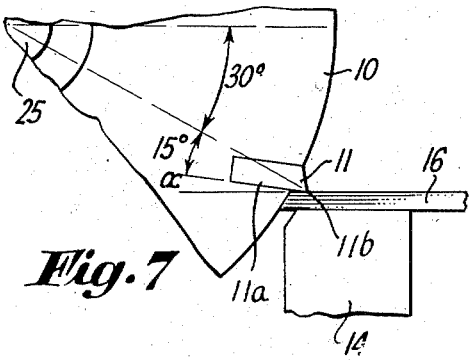
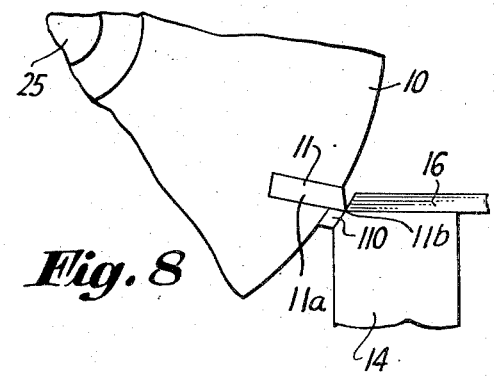
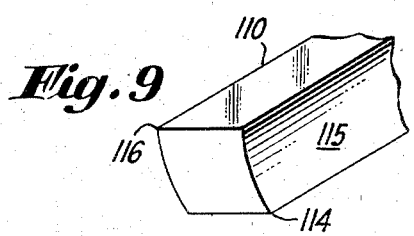
INVENTOR
STANLEY J. GARTNER
BY
ATTORNEY

United States Patent Office 2,699,831
Patented Jan. 18, 1955

2,699,831

REEL TYPE STRIP CUTTER WITH RAKE ANGLE AND CHIP DISCHARGE

Stanley J. Gartner, Emporium, Pa., assignor to Sylvania Electric Products, Inc., a corporation of Massachusetts Application November 22, 1949, Serial No. 128,789

8 Claims. (Cl. 164—68)

The present invention relates to the cutting of thin uniform strips or ribbons from a thin sheet of metal or other combustible material to produce a filling material for flash lamps. It has heretofore been known to produce narrow strips or ribbons of a combustible metal material by repeated cutting or trimming operations on a thin sheet of metal which is readily and economically procurable, such strips or ribbons being intended to be introduced into the bulb of a flash lamp and which may be ignited and burned extremely rapidly to produce an intense flash of light. However the cutting operation, with apparatus which has heretofore been known was very difficult to accomplish satisfactorily. The combustible metal is ordinarily supplied in the form of a roll of sheet metal of the order of one one-thousandth of an inch in thickness and of considerable length. The strength of the sheet material, which is preferably aluminum, magnesium or an alloy thereof, is relatively slight and it may readily be bent or stretched out of shape. The feeding and cutting operations were therefore extremely difficult.

Cutting machines as previously used have not proved entirely satisfactory for cutting extremely narrow and uniformly shaped strips or ribbons from the metal sheet in a precise and rapid manner, since they tended to tear the sheet because of the thinness of the material or they did not produce strips of sufficient uniformity. Furthermore, the cut strips tended to adhere to the cutting knives and clogged the machine. An object therefore of the present invention is to provide a more economical apparatus for cutting narrow strips or ribbons of combustible material.

Another object of the present invention is the provision of apparatus for cutting extremely narrow and uniformly shaped strips or ribbons from thin metal sheets in a precise and rapid manner.

A further object of the present invention is to provide a cutting apparatus as aforesaid which will produce large numbers of such strips at a high rate of speed without requiring a great deal of supervisory attention or maintenance work.

Still another object of the present invention is the provision of a foil cutting machine which will operate for long periods of time without attention and without requiring the use of a cutting lubricant.

Still a further object of the present invention is the production of an improved combustible metal ribbon.

The foregoing objects and others which may appear from the following detailed description are attained in accordance with an aspect of the present invention by providing a reel-type cutting mechanism with the cutting blades disposed at such an angle to the radii of the reel and the stationary cutting blade in such position that each movable cutting blade as it engages the material to be cut tends to have a positive angle of rake whereby the material to be cut is drawn lightly but definitely into the cut. After the shear is completed the angle of rake of the cutting edge as it recedes from the cut becomes negative, whereby the pressure of the cut material against the cutting blade tends to cause the ribbon to slide off the edge of the blade without sticking thereto. This in conjunction with the highly polished face of the cutting tool promotes the accurate shearing of thin strips of metal from the sheet material without requiring the addition of a lubricant to the surface of the metal to be cut and without causing a build up of the material on the cutting tool. Tests of a machine constructed according to the principles of the present invention have indicated that such a machine can be operated for long periods of time without any attention and without any jamming of the cut material in the machine.

The present invention will be more fully understood by reference to the following detailed description which is accompanied by a drawing in which Figure 1 illustrates in partial sectional view a side elevation of an embodiment of the present invention, while Figure 2 illustrates in a partial sectional view an end elevation of the machine of Figure 1, and Figure 3 is a fragmentary view of the other end of the machine.

Figure 4 is a plan view partly in section of the machine with certain parts removed for clarity while Figure 5 is an enlarged longitudinal section of the machine of Figure 1 taken along line 5—5 of Figure 4 showing some of the feeding mechanism in greater detail while Figure 6 is a transverse sectional view taken along the line 6—6 of Figure 4;

Figure 7 is a greatly enlarged view of a portion of the cutting head of the machine of Figure 1 with one of the cutting blades just engaging the material to be cut while Figure 8 is a view similar to Figure 7 showing the relative positions of the cutting tool and the cut material at the conclusion of a cut, and Figure 9 is an enormously enlarged perspective view of a portion of the cut strip produced by the machine of the preceding figures.

The machine of Figure 1 includes a cutting reel 10 having a number of transversely extending cutting blades 11 mounted on the periphery thereof, each of which is adapted in turn to engage the stationary cutting bar 14. A sheet of thin strip material 16 from roll 15 is fed through drive roller arrangement 18, an adjustable spring biased idler 20 and over the feeding table 22, thence into engagement with the cutting knives 11, 14, where it is sheared into narrow strips which are collected by an air duct not shown in this figure and from there fed into a glass bulb which is later evacuated and sealed off.

The cutting reel 10 is driven by a motor (not shown) through the intermediary of a belt 23. The pulley 24 carrying belt 23 is mounted on a rotatable shaft 25 which also carries the cutting reel 10. A skew gear 30 on shaft 25 engages its mating gear 31 whereby the intermediate shaft 33 is driven. A separate similar pair of gears 34, 35 drives a longitudinal shaft 40 which by means of worm 41 and worm-wheel 42 drives the feed mechanism whereby the sheet material is fed into the cut.

The main feed mechanism does not directly draw the sheet material 16 to be cut from the feed roll 15, this being done by roller driving means 18 which withdraws the sheet material from roll 15 and supplies it to idler 20. The roller driver is shown at the left hand part of Figure 1 and in partial section in Figure 3. The sheet material passes between a pair of rollers 50 and 51 on its way from roll 15 to the cutting mechanism. The lower of these two rolls 51 is driven from motor 53 through a train of gears 54 at an average rate which corresponds to the rate at which the sheet material is reduced into thin ribbons. The feed of sheet material at a constant average rate between rollers 50 and 51 supplies the sheet material to a loop at 20 from which the material is drawn as required by the main feed mechanism.

The main feed mechanism is shown in more detail in Figures 4 and 5 and includes two sets of interdigitated fingers 55 and 57. These fingers are flat on the top surface and are provided with a number of small suction apertures 59. The fingers are hollow to provide an air passage through their length. The air passages within fingers 55 are connected to a manifold 60 while those within fingers 57 are connected similarly to a manifold 61. All of the fingers 55 are oscillated back and forth in the plane of the feed table in an opposing phase relationship to a similar oscillation of feed fingers 57. While fingers 55 are advancing to the right (in Figure 4) suction is applied to manifold 60 whereby the sheet material is held against the suction apertures 59 thus advancing the sheet material. At the end of the forward travel of fingers 55 the suction on manifold 60 is cut off and fingers 57 which are then in their furthest left position begin their forward advance and suction is applied to manifold 61.

The back and forth reciprocation of the feed fingers is accomplished by means of cams 70 and 71 which are driven by worm-wheel 42 through friction clutch 74. A roller cam follower 76 riding on the surface of cam 70 is carried by crosshead 78. Crosshead 78 is carried by rods 79 and 80 which are directly connected at their right hand ends to the manifold 60. The crosshead 78 is normally urged in a leftward direction by the action of spring 82, so that the cam follower 76 always remains against the cam 70. The manifold 61 is connected to a pair of rods 89 and 90 which carry a crosshead 88 upon which is mounted a cam follower 86 which bears against a second cam 71. The crosshead 88 is normally urged in a leftward direction by the action of spring 92.

As shown more clearly in Figure 6 cam 70 has on its upper surface a plate cam 94 having a groove in which rides a cam follower 95. Cam follower 95 operates piston 96 of a suction switching valve 97 whereby suction in line 98 is alternately applied through tubes 99 and 100 to manifolds 60 and 61. As each set of corresponding feed fingers takes up its forward travel valve 97 also cuts off the suction from the one of manifolds 60 and 61 which is travelling in the backward direction and connects it to the open air so that the feed fingers which are not operating to feed the ribbon forward are ineffective.

Figures 7 and 8 are enormously enlarged partial views of the cutting reel 10, its cooperating stationary knife 14 and the sheet material 16 which is to be cut into ribbons.

It will be noted that the leading cutting face 11a of cutter 11 lies at a substantial angle to a radius of reel 10 and engages the strip material at a point considerably below the axis of rotation of the cutting reel 10. A radius line drawn from the cutting edge 11b of the one of cutters 11 which is just engaging the cut to the axis of reel 10 forms an angle of approximately 30 degrees below the horizontal.

Since the leading cutting face 11a of blade 11 is not radial but lies at an angle to the radius such that at the beginning of the cut a slight positive rake angle alpha is formed, there is no tendency of the sheet material being cut to be forced away from the cut but rather there is a slight tendency for the material to be drawn into the cut. This assures a clean shearing action between cutter 11 and the stationary cutter bar 14. As shown in Figure 8 after cutter blade 11 has completed a cut, the angle between the leading cutting face 11a of blade 11 and a tangent to the cutter reel 10 is such that the cut strip of metal 110 tends to slide off the end of the cutter as soon as it has cleared the stationary cutter bar 14.

The leading cutting faces 11a form an open obtuse angle with relation to a line tangent to the periphery of the reel at the intersection of the respective leading faces and the periphery of the reel whereby the cut strip material tends to be ejected from contact with the blades. This tendency is aided by having the cutting face 11a of cutter bar 11 polished to a mirror surface. After the cut ribbon 110 has dropped free from the stationary cutter bar 14 and the moving blade 11 it is picked up by a current of air and passed into pipe 112 (Figure 5), whereby it may be introduced into a glass bulb which is thereafter provided with an igniting primer, filled with oxygen at a desired pressure and sealed off.

An enormously enlarged piece of the cut ribbon is shown in Figure 9. Due to the peculiar angle of cut employed in the present invention it will be noted that the ribbon 110 has a pair of corners 114 and 116 which are considerably more acute than a right angle. Also curved concave face 115 and a corresponding curved face on the other side of the strip provide a larger area of contact between the oxygen within the bulb and the metal of which strip 110 is made, than would be the case if strip 110 were sheared straight across. It has been found that these factors enhance the ease of ignition and uniformity of burning of the strip 110 whereby an improved flash bulb may be produced. In view of the exactness with which the machine must be set up and the accuracy of cut required, I have provided, as shown in Figures 4 and 5, means for assuring constant operating conditions which include a massive reservoir of oil 120 which is temperature controlled at a temperature well above that which the machine would normally reach during operation. Also shaft 25 for this cutting reel 10 is hollow and a flow of air from a coil 122 within oil reservoir 120 is introduced into the hollow of shaft 25 by means of air pipe 124. I have found that if the oil in reservoir 120 is maintained at a constant temperature of for example 120° F. and the cutting blades 11 set while at that temperature, the machine will continue to operate for long periods of time with substantially no variation in dimensions of the cut strips and without any tendency for the cut foil to stick or jam.

While I have shown and particularly described an embodiment of my invention, it should be distinctly understood that my invention is not limited thereto but that modifications within the scope of the invention may be made.

What is claimed is:

1. A cutting machine including a stationary cutting bar and a rotatable reel having a number of cutting blades each having a leading face terminating in a cutting edge and adapted to successively pass by in cutting engagement with said stationary cutting bar, and feeding means for advancing the end of a strip of thin sheet material over the edge of said stationary cutting bar in minute increments of the order of the thickness of said strip, the axis of rotation of said reel being parallel to said stationary cutting bar and substantially above the line of advance of said strip, said cutting blades being transversely mounted in said reel with their leading faces forming a positive rake angle with the surface of said strip at the edge of said stationary cutting bar as the cutting edges of said blades engage the surface of said strip such that said strip tends to be drawn into the cut, and said leading faces further forming an open obtuse angle with relation to the surface of the reel immediately before said blades, whereby the cut strip material tends to be ejected from said contact with said blades.

2. A foil cutting machine including a stationary cutting bar and a reel adapted to rotate about an axis parallel to said cutting bar and having a number of transversely extending cutting blades each having a leading face adapted to successively pass by in cutting engagement with said stationary bar, the axis of rotation of said reel being spaced above said cutting bar, and sheet feeding means for advancing the end of a strip of material over the edge of said stationary bar, said reel being so disposed that a line from the center of rotation of said reel passing through the point of engagement between said blades and said strip of material forms an angle of the order of 30° with the surface of said material, said blades having their leading faces forming an acute angle with said line less than said first-named angle, each of said leading faces forming an open obtuse angle with a line tangent to said reel at the intersection of said leading face with the periphery of said reel.

3. A cutting machine including a stationary cutting bar and a rotatable cylindrical reel having a number of transversely disposed cutting blades extending from its periphery and adapted to successively pass by in cutting engagement with said stationary bar, and sheet feeding means for advancing the end of a strip of sheet material over the edge of said stationary bar, said reel having its axis of rotation spaced above said edge of said stationary bar and being so disposed that a first line from the center of rotation of said reel passing through the point of engagement between each of said blades and said sheet forms an acute angle with the surface of said sheet, the leading face of each of said blades forming an open obtuse angle with a second line immediately before said blades and tangent to the periphery of said reel at the location of said leading face, said open obtuse angle being of such magnitude that the leading face of each of said blades forms an acute angle with said first line of a magnitude less than said first named angle and each of said blades engages said sheet with a positive cutting rake angle.

4. A cutting machine including a stationary cutting bar and a rotatable reel having a number of transversely-extending cutting blades adapted to successively pass by in cutting engagement with said stationary bar, and sheet feeding means for advancing the end of a strip of sheet material over the edge of said stationary bar, said reel having its axis of rotation spaced above said edge of said stationary bar and being so disposed that a line from the center of rotation of said reel passing through the point of engagement between said blades and said sheet material forms an angle of the order of 30° with the surface of said material, and said blades being tilted back so that the leading face of each of said blades forms an angle of the order of 15° with said line, the leading face of each of said blades further forming an open obtuse angle with relation to the surface of said reel immediately before said blades.

5. A foil-cutting machine including a stationary cutting bar and a rotatable reel having a number of transversely-extending blades adapted to successively pass by in cutting engagement with said stationary bar, and sheet feeding means for advancing the end of a strip of material over the edge of said stationary bar, said reel having its axis of rotation spaced above said edge of said stationary bar and being so disposed that a line from the center of rotation of said reel passing through the point of engagement between said blades and said strip material forms an acute angle with the surface of said material, the leading face of each of said blades forming an angle with regard to said line which is more acute than the first-named said angle, whereby the leading face of said blades engages said strip material with a positive cutting rake angle, and the leading face of each of said blades forming an open obtuse angle with relation to the surface of said reel immediately before said blades.

6. A foil cutting machine comprising a stationary bar having a cutting edge and a reel adapted to rotate about an axis parallel to said cutting bar and including a number of transversely-extending blades adapted to successively pass by in cutting engagement with the cutting edge of said stationary bar, each of said blades being formed with a leading face terminating in a cutting edge, and sheet feeding means for advancing the end of a strip of material over the cutting edge of said stationary bar, said reel having its axis of rotation spaced above said edge of said stationary bar and being so disposed that a center line of said reel passing through the cutting edge of each of said blades forms an acute angle with the surface of said strip of material, the leading face of each of said blades forming an acute angle with said center line less than said first-named angle, and the leading face of each of said blades forming an open obtuse angle with a tangent to the surface of said reel immediately before said blades.

7. A foil cutting machine including a stationary cutting bar and a rotatable reel having a number of cutting blades adapted to successively pass by in cutting engagement with said stationary bar, means for maintaining said machine at a uniform temperature higher than its ambient temperature of operation, and sheet feeding means for advancing the end of a strip of material over the edge of said stationary bar, said reel having its axis of rotation spaced above said edge of said stationary bar and being so disposed that a line from the center of rotation of said reel passing through the point of engagement between said blades and said strip of material forms an acute angle with the surface of said material, the leading face of said blades forming an angle with regard to said line which is more acute than the first-named said angle, the leading face of each of said blades forming an open obtuse angle with a line tangent to the surface of said reel substantially at the intersection of said leading face with said surface.

8. A foil cutting machine including a stationary cutting bar and a rotatable reel having a number of cutting blades adapted to successively pass by in cutting engagement with said stationary bar, means for maintaining said machine at a uniform temperature higher than its ambient temperature of operation, said means including a body of fluid maintained at said uniform temperature and contained within said machine and circulated through said reel, and sheet feeding means for advancing the end of a strip of material over the edge of said stationary bar, said reel having its axis of rotation spaced above said edge of said stationary bar and being so disposed that a line from the center of rotation of said reel passing through the point of engagement between said blades and said strip of material forms an acute angle with the surface of said material, the leading face of said blades forming an angle with regard to said line which is more acute than the first-named said angle, the leading face of each of said blades forming an open obtuse angle with a line tangent to the surface of said reel substantially at the intersection of said leading face with said surface.

References Cited in the file of this patent

UNITED STATES PATENTS

| | | |
|---|---|---|
| 1,182,417 | Overbury | May 9, 1916 |
| 1,313,224 | Hultberg | Aug. 12, 1919 |
| 1,569,032 | Reichel | Jan. 12, 1926 |
| 2,151,930 | Messing et al. | Mar. 28, 1928 |
| 2,221,127 | Bates | Nov. 12, 1940 |
| 2,305,312 | Kern | Dec. 15, 1942 |
| 2,351,290 | Rippl et al. | June 13, 1944 |
| 2,621,736 | Scruggs | Dec. 16, 1952 |

FOREIGN PATENTS

| | | |
|---|---|---|
| 51,165 | Sweden | Sept. 10, 1917 |